No. 731,179. PATENTED JUNE 16, 1903.
J. HARRISON & G. HINCH.
DISK PLOW.
APPLICATION FILED OCT. 1, 1902.
NO MODEL. 2 SHEETS—SHEET 1.
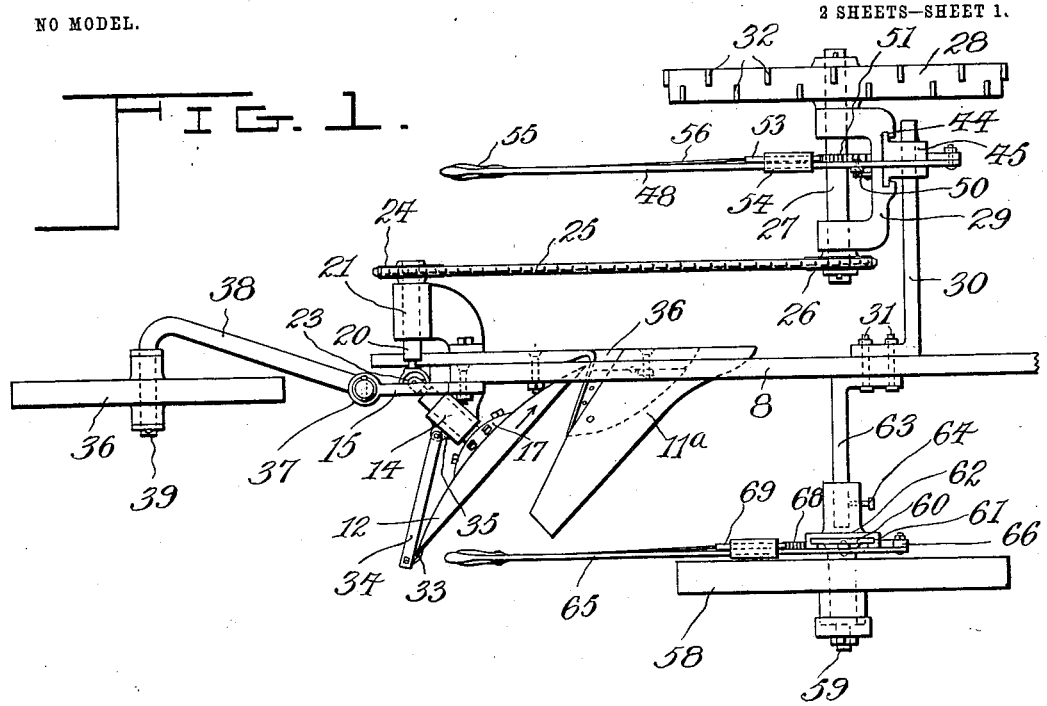
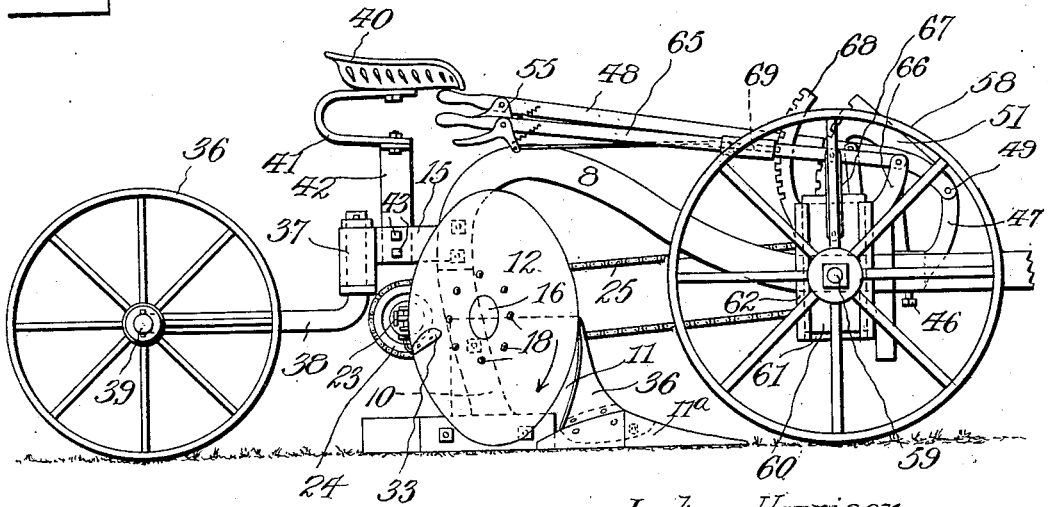
Witnesses:
Ned Page
George W. Colle
Inventors
Jackson Harrison
George Hinch
By Marion & Marion
Attorneys

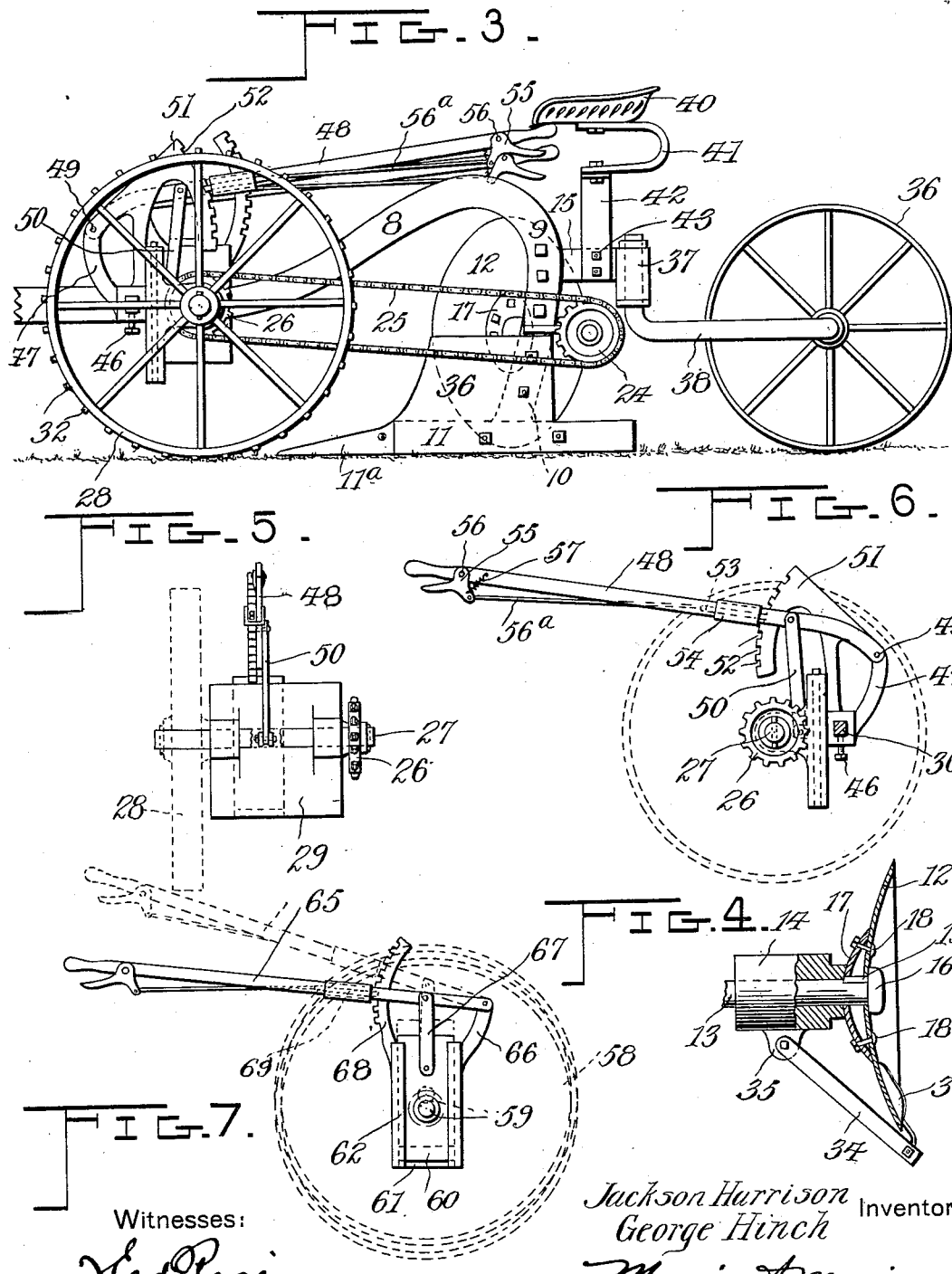

No. 731,179. Patented June 16, 1903.

UNITED STATES PATENT OFFICE.

JACKSON HARRISON AND GEORGE HINCH, OF ST. MARY'S, CANADA.

DISK PLOW.

SPECIFICATION forming part of Letters Patent No. 731,179, dated June 16, 1903.

Application filed October 1, 1902. Serial No. 125,480. (No model.)

*To all whom it may concern:*

Be it known that we, JACKSON HARRISON and GEORGE HINCH, subjects of the King of Great Britain, residing at St. Mary's, Assiniboia, North-West Territories, Canada, have invented certain new and useful Improvements in Disk Plows; and we do hereby declare that the following is a full, clear, and exact description of the invention, such as will enable others skilled in the art to which it appertains to make and use the same.

Our invention relates to an improved disk plow, being of the wheeled type and intended especially for the purpose of plowing land much overgrown with weeds and brush.

The object of our invention is to produce a plow which shall combine the advantages of the ordinary share-plow and the disk plow and enable heavy land to be not simply cut and raised, but to be readily and completely turned over and broken without being hindered or obstructed in its action by brush and weeds catching in the operating mechanism.

It is our experience that a disk plow does not give satisfaction on land which is more or less covered with brush, as the disk will not cut the brush, but, on the other hand, that while the ordinary share-plow will cut the brush, yet after the brush has been cut the loose soil has not sufficient force to drive the disk properly, and hence it is our object to provide independent means for driving the plow at a regular speed, whereby the disk cannot become clogged and the weeds are regularly turned under as fast as the furrow-slice is cut.

To these ends our invention consists in the combination of a share-plow with a rotatable disk arranged at an oblique angle to the draft-line of the plow. The share itself is a very narrow one and serves merely to cut the land, while the disk serves to turn it, and we therefore provide the disk with a rotatable shaft, on which it is mounted and which is turned, through the medium of gearing, by means of a wheel mounted on the land side of the plow-beam and extending rectangularly therefrom, which wheel is caused to turn by the tractive effect exerted by the ground over which the plow passes.

Our invention further consists in providing the disk with a stationary scraper mounted at one side thereof and projecting thereinto, so as to remove the land and the weeds from the front face of the disk and prevent the latter from becoming clogged or balled up.

Our invention further consists in providing means for regulating the draft of the plow, whereby the share is raised and lowered with relation to the level of the ground, so as to cut a deeper or shallower furrow therein, according as may be desired, this means being operable from the seat of the driver, and said means are provided independently for each side of the plow—that is to say, for the land-wheel and the furrow-wheel thereof.

Our invention further consists in the construction and combination of parts hereinafter described, and more particularly set forth in the claims.

We have illustrated our improved disk plow in its preferred form in the accompanying drawings, wherein—

Figure 1 is a plan view of the plow. Fig. 2 is a side elevation thereof from the right or furrow side. Fig. 3 is a side elevation from the left or land side. Fig. 4 is a horizontal central section through the disk, showing the arrangement thereof and especially that of the scraper. Fig. 5 is a rear detail view of the adjusting devices for the land-wheel of the plow. Fig. 6 is a side elevation of the same. Fig. 7 is a side elevation from the right side of the adjusting mechanism of the furrow-wheel, the latter being removed from the axle and its position indicated in dotted lines.

The same numerals of reference denote like parts in all the figures of the drawings.

The fundamental features of our plow comprise a beam 8, provided at its front end with any suitable draft-attaching means. (Not shown in the drawings.) The rear end of the beam 8 is bent vertically, as shown at 9, and has attached thereto a standard 10, to which the landside 11 is secured, and the latter has formed on its front end the share 11ª. Immediately behind the share is mounted the disk 12, which forms substantially a continuation of the share and takes the place of the moldboard used in the ordinary plow.

The disk 12 is rigidly keyed upon the end of a rotating shaft 13, which is rotatably held in a bearing-lug 14, bolted to one side of the plow-beam, as shown, or rather forming a part of a forged piece 15, which extends rearwardly and also forms means of attachment for the steering-wheel 36, having a vertical pivot-lug 37 at its rear end, in which is rotatably mounted the steering-arm 38, which carries on its rear end the axle 39, on which the wheel 36 turns. This wheel, as shown, trails in the rear of the plow and in line with the share or colter thereof, so as to assist in carrying the plow easily around curves. The forging 15 also provides means for supporting the seat of the driver, (indicated by the numeral 40,) and supported upon a spring 41 on the top of a post 42, which is secured to the piece 15 by bolts 43, as shown. By its support in the lug 14 the disk 12 is held rigidly against the pressure of the land or furrow slice turned up by the plowshare; but it is permitted to rotate and is, moreover, positively caused to do so by the means to be presently pointed out. The forward end of the shaft 13 may have a head 16 formed thereon, and the disk is supported at right angles to the shaft by means of a cup-shaped thimble or brace-disk 17, which is smaller than the disk 12 and has a greater degree of concavity than the latter, as shown in Fig. 4, and this disk 17 is rigidly fixed to the disk 12 by means of bolts 18, and both are fixed to the shaft by any suitable means, such as a key 19. The rear end of the shaft 13 extends, as shown, beyond the lug 14, and it meets at an angle a second shaft 20, which is mounted in a bearing-lug 21 at right angles to the line of draft of the plow, this bearing-lug being bolted to the opposite side of the beam 8 from the lug 14. The shaft 20 is connected operatively to the shaft 13 by means of a universal joint 23, and on its other end it has fixed a sprocket-wheel 24, over which passes a chain 25, which chain serves to connect the wheel 24 operatively with the sprocket-gear 26, carried on the inner end of the main shaft 27, which is rotated by the land-wheel 28, which supports the plow and is rotated by frictional contact with the ground. The shaft 27 of the wheel 28 is carried in a bearing-block 29, the rear side of which is provided with a dovetailed vertical channel or groove 44, in which is slidably mounted a stationary block 45, which is adjustably fixed to the end of the bracket-arm 30, which projects horizontally at right angles to the beam 8 of the plow and is secured thereto by bolts 31. The block 45 is fixed in position on the beam 30 by a clamping-screw 46, and it has rising from the upper side thereof a standard 47, upon which is pivotally mounted a hand-lever 48, turning on a pin 49. This hand-lever is connected by a link 50 to the sliding bearing-block 29, so that by raising and lowering the lever the bearing-block 29 is slid vertically upon the block 45, or rather the bracket-arm 30 is caused to be raised farther from the ground by depressing said lever, and vice versa. Furthermore, the standard 47 carries a rearwardly-projecting arcuate lug 51, which is provided at its rear edge with a series of notches 52, in which engages the latch-bolt 53, slidably mounted in a guide 54 on the lever 48 and operated by a bell-crank lever 55, pivoted at 56 to the hand-lever and connected to the bolt 53 by a link 56ª. The bolt 53 is held resiliently in contact with the notches 52 by a spring 57; but any preferable arrangement may be adopted for holding the lever 48 in its adjusted position.

The wheel 28 is formed, preferably, with projecting snugs or teeth 32, whereby it is caused to engage operatively with the land over which it passes and to be kept in continual movement thereby. It will be seen, therefore, that as the plow is drawn along the ground the rotation of the wheel 28 will in turn rotate the sprocket-wheel 26 and through the medium of the chain 25 will also rotate the shafts 20 and 13 and the disk 12 in the direction of the arrow, thus assisting the action of the share 11 in turning over the soil and performing the function of completely overturning the furrow-slice as fast as it is formed and burying the weeds and brush thereunder. The right-hand or furrow side of the plow is similarly provided with an adjustable supporting-wheel 58, which is pivoted on an axle 59, projecting from a sliding block 60, which is mounted to slide in a vertical groove 61, formed in the outer face of a block 62, which is adjustably fixed upon the end of a bracket-arm 63, projecting horizontally from the right-hand side of the plow-arm and secured thereto by the same bolts 31 which secure the arm 30. The clamping-screw 64 serves to secure the block 62 in position. The furrow-wheel has a similar hand adjusting arrangement to the land-wheel, comprising a hand-lever 65, pivoted on the end of an upstanding arm 66 and connected by a link 67 to the sliding block 60 and supported in its adjusted position by a notched bracket 68 and latch-bolt 69, all arranged and operated in an identical manner with the same parts as already described for the land-wheel. In order, however, to complete the apparatus and prevent the disk from becoming engaged with weeds and clogged with soil and the like, we prefer to provide a stationary scraper 33, which is mounted on the end of an arm 34, bolted to a lug 35, formed on the side of the bearing-block 14. This scraper 33 is arranged to follow the contour of the disk and to detach adherent material from the rising side thereof as the disk rotates, and, furthermore, we prefer to fix a shield 36 to the beam 8 and landside 11 immediately over the share, so as to guard against weeds and brush being thrown against the descending face of the disk and becoming entangled therewith and with the parts behind the disk.

While we have shown in the accompanying drawings the preferred form of our invention, it will be understood that we do not limit ourselves to the precise form shown, for many of the details may be changed in form or position without affecting the operativeness or utility of our invention, and we therefore reserve the right to make all such modifications as are included within the scope of the following claims or of mechanical equivalents to the structures set forth.

Having thus described our invention, what we claim as new, and desire to secure by Letters Patent, is—

1. In a disk plow, in combination, a bearing-block, a wheel carried thereby and adapted to rotate when said plow advances, a beam connected to said bearing-block, means for adjusting said beam vertically with respect to said bearing-block, a disk rotatably mounted and supported from said beam, a sprocket-wheel adapted to be driven by said wheel, a second sprocket-wheel adapted to drive said disk, and a loose chain connecting said sprocket-wheels, whereby said vertical adjustment is permitted.

2. In a disk plow, in combination, a pair of oppositely-disposed main wheels, a beam disposed between said wheels, oppositely-disposed bracket-arms carried by said beam and adapted to support the same upon said wheels, means for raising and lowering said beam, a rotatable disk carried by said beam, a sprocket-wheel adapted to drive said disk, a second sprocket-wheel adapted to be driven by one of said main wheels, and a loose chain connecting said sprocket-wheels.

3. In a disk plow, in combination, a pair of oppositely-disposed main wheels, a bearing-block, a shaft carried thereby and constituting an axle for one of said wheels, a pair of bracket-arms supported by said wheels, a beam secured to said bracket-arms, means located respectively adjacent to said wheels for adjusting said beam vertically, a rotatable disk, a bracket constituting a bearing therefor and carried by said beam, a sprocket-wheel adapted to drive said disk, a second sprocket-wheel carried by the inner extremity of said shaft, and a loose driving-chain connecting with said sprocket-wheels.

In witness whereof we have hereunto set our hands in the presence of two witnesses.

JACKSON HARRISON.
GEORGE HINCH.

Witnesses:
JOSEPH HARRISON,
CHRISTOPHER DICKINSON.